Patented Sept. 25, 1951

2,568,964

UNITED STATES PATENT OFFICE 2,568,964

CATALYTIC ISOMERIZATION OF OLEFINIC HYDROCARBONS

Charles W. Montgomery and George L. Sumner, Jr., Oakmont, Pa., and Lloyd Berg, Bozeman, Mont., assignors to Gulf Research & Development Company, Pittsburgh, Pa., a corporation of Delaware No Drawing. Application January 20, 1947, Serial No. 723,210

13 Claims. (Cl. 260—683.2)

This invention relates to the catalytic isomerization of olefinic hydrocarbons and, more particularly, to a process for the catalytic isomerization of an olefin-containing gasoline to increase its anti-knock rating.

The process of isomerization is particularly applicable where it is desired to increase the anti-knock rating of gasolines or naphthas containing an appreciable quantity of olefins, such as a gasoline obtained by thermal cracking. This is so because the olefin constituents of most thermally cracked gasolines have an average octane rating considerably below that of the composition corresponding to the thermodynamic equilibrium value for those constituents, and therefore a process which tends toward the establishment of this equilibrium between the various isomers will be characterized by a considerable octane improvement. However, there exists a definite limit on the ultimate octane improvement attainable by olefin isomerization alone, due to the impracticability of exceeding the thermodynamic equilibrium value. This explains the observed fact that usually, the lower the original octane rating of the charge, the greater will be the increase upon isomerization. It also accounts for the fact that branched chain stocks or stocks which have been isomerized to some extent do not respond to isomerization as well as stocks characterized by a high content of non-branched type olefins. Thus, catalytically cracked gasolines which have been isomerized to some extent by the cracking catalyst, as well as olefinic polyform stocks, that is, gasoline cracked in the presence of light hydrocarbon gases, are not subject to as great an improvement by isomerization as are thermally cracked distillates and coke still gasolines.

In carrying out isomerization reactions, it is desirable to hold side reactions such as cracking, saturation, aromatization, and hydrogen transfer to a minimum. In the prior art processes of isomerization, these side reactions have not been sufficiently suppressed because the catalysts and conditions described in these processes are normally of such a nature as to bring about such undesired reactions. Also, those prior art processes which have been directed to gasolines have usually been concerned with improving the octane number from 55-60 to 65-68, while it is most desirable to improve thermally cracked stocks already having an octane number on the order of 66 by upgrading them to a rating on the order of 70.

In our prior U. S. Patent 2,397,639, we have shown that the use of alumina impregnated with anhydrous hydrogen chloride as a catalyst for isomerization reactions overcomes the above-mentioned difficulties of the prior art. However, although the process of our patent has proved to be very effective, substantial quantities of hydrogen chloride are required for efficient operation, and a bauxite after-treater is necessary to remove chlorides from the products. It is therefore highly desirable from an economical and practical point of view to provide an improved catalyst which eliminates these disadvantages, while retaining the advantages of our patented process.

Accordingly, this invention has as an object the provision of an improved isomerization process wherein the catalyst may be activated and reactivated by minimum quantities of the activating agent.

A further object of this invention is to provide an isomerization process which will require no after-treater step to remove residual activation agent from the isomerized stock, the activation agent being more completely retained by the catalyst carrier.

A still further object of this invention is to provide an isomerization process which is capable of increasing the octane number of thermally cracked stocks having a rating of 65-68 to a rating of 71-72, and such that cracking, saturation, aromatization, hydrogen transfer, and other side reactions are held to a minimum. Other objects will appear hereinafter.

These objects are accomplished by the present invention wherein olefin-containing hydrocarbons are passed under isomerization conditions over a catalyst consisting of alumina which has been impregnated with gaseous, anhydrous, hydrogen fluoride.

More specifically, the isomerization conditions include a temperature range of from 300° to 600° C., a space velocity of from 0.1 to 20 volumes of hydrocarbon per hour per volume of catalyst, and pressures from 0 to 200 pounds per square inch.

Optimum results are obtained with a temperature range of 375° to 425° C., a space velocity of 0.3 to 1.3 at atmospheric pressure.

The process is characterized by liquid yields in excess of 95 per cent and usually as high as 97 to 99 per cent. The reaction is almost entirely one of isomerization since there is very little cracking, saturation, aromatization, and hydrogen transfer. Octane numbers of thermally cracked stocks are increased substantially even when the higher octane rating charge stocks are used.

The catalyst for the present invention is alumina which is maintained at a proper degree of activation by impregnating with anhydrous hydrogen fluoride. The physical shape of the alumina appears to have little effect upon the catalytic activity, equally successful results having been obtained with ⅛ inch pellets and with 8–14 mesh granules. The catalyst may be prepared as follows: 800 parts by volume of ⅛ inch alumina pellets are dried at 250° C. and after cooling to room temperature, anhydrous hydrogen fluoride is passed through the pellets for two hours. Heat is then applied and the anhydrous hydrogen fluoride passed through for another hour, at which time the temperature is gradually allowed to reach 400° C., the reaction temperature. The catalyst is then purged with nitrogen gas for about 15 minutes. A catalyst prepared as disclosed above was found to contain about 0.59 volumes of adsorbed anhydrous hydrogen fluoride per volume of catalyst. This corresponds to a weight per cent of 0.06, whereas the weight per cent of anhydrous hydrogen chloride adsorbed in accordance with the invention of our prior U. S. Patent 2,397,639 amounted to 0.7, or approximately ten times the amount of hydrogen fluoride adsorbed.

As the catalyst is used in the isomerization process, a deposit of carbonaceous material is laid down upon the catalyst surface, reducing its activity and necessitating periodic burn-offs. Burning-off can be accomplished with an oxygen-containing gas, such as oxygen or air, while maintaining the burn-off temperature below the sintering temperature of the catalyst, about 1100° F. The burn-off or regeneration does not result in any appreciable loss of catalyst activity; however, the catalyst will gradually lose activity after long periods of continued use, necessitating reactivation with hydrogen fluoride to restore the catalyst to its original activity. Although the reactivation is performed periodically, it is noteworthy that the period of time between reactivations may be considerably longer than the period between regenerations or burn-offs. Furthermore, the loss of activity for any period of time is much less than that experienced with the catalyst of our prior patent hereinabove referred to.

Following the interruption of the flow of gasoline over the catalyst and its regeneration with air, reactivation is conveniently accomplished by passing 1 to 20 volumes of anhydrous hydrogen fluoride per volume of catalyst over the catalyst at room temperature and then gradually raising the temperature to that of the reaction. After the excess hydrogen fluoride has been swept out with an inert gas, the hydrocarbon feed is again passed over the catalyst.

The following illustrates the remarkable results obtained in accordance with our invention. A series of 23 runs were made wherein stabilized thermally cracked gasolines having boiling ranges on the order of 92° to 415° F. were passed over ⅛ inch alumina pellets activated with anhydrous hydrogen fluoride, isomerization taking place at a temperature of 400° C., a space velocity of 0.5 and under atmospheric pressure. Between each run, the carbonaceous deposits were burned off, the length of each cycle or run between burn-offs corresponding to about 9 volumes of charge per volume of catalyst. Although a total of 204 volumes of charge per volume of catalyst were passed over the catalyst throughout the series of runs, at no time during the course of the 23 runs was the catalyst reactivated with more hydrogen fluoride. This unusual stability and long life of the catalyst is illustrated in the table where is summarized data relating to runs 1, 12 and 23. The octane numbers of both charge and product were determined after normal butane had been added to yield a gasoline having a Reid vapor pressure of 10±1 pounds per square inch.

Table

| Run No. | 1 | 12 | 23 |
| --- | --- | --- | --- |
| Octane No. of Charge: | | | |
| A. S. T. M. Motor Method, Clear | 65.7 | 64.5 | 66.7 |
| A. S. T. M. Motor Method+3 cc. T. E. L. | 77.5 | 77.0 | 78.8 |
| Octane No. of Product: | | | |
| A. S. T. M. Motor Method, Clear | 69.5 | 68.9 | 69.1 |
| A. S. T. M. Motor Method+3 cc. T. E. L. | 79.9 | 81.4 | 81.5 |
| Octane No. Improvement: | | | |
| A. S. T. M. Motor Method, Clear | 3.8 | 4.4 | 2.4 |
| A. S. T. M. Motor Method+3 cc. T. E. L. | 2.4 | 4.4 | 2.7 |

Although these results indicate that the octane number improvement remains substantially constant for a considerable period of time, it does appear to fall off slightly in the latter runs. For this reason, the alumina catalyst was decarbonized and revivified after run 23 by a hydrogen fluoride treatment carried out in the same manner as that in the initial activation. Another run followed this treatment and was conducted under conditions similar to the runs preceding it. The results of this run indicated an octane number improvement of 3.6 by the motor method, clear, and compares quite favorably with the improvement of 3.8 in the first run.

Whereas the length of the cycle between carbon burn-offs was about 9 volumes of charge per volume of catalyst for the particular runs described above, good results may be obtained with a cycle of 10 to 30 volumes of charge per volume of catalyst. An advantageous cycle is in the range 15 to 20 volumes of charge per volume of catalyst, the octane improvement remaining substantially constant. As the above data indicates, reactivation with hydrogen fluoride is not required after each carbon burn-off. The small carbon deposit obtained indicates that very little side reactions, such as cracking or dehydrogenation, have occurred. Other indications that isomerization is the predominant reaction occurring are evident from the following inspection data on the charge and product for a typical run.

| | Charge | Product |
| --- | --- | --- |
| Bromine No | 55.3 | 56.7 |
| Aromatics | 14.7 | 13.6 |
| Olefins | 38.7 | 39.8 |
| Paraffins+Naphthenes | 46.6 | 46.6 |

Since it was known that the process of our prior patent led to the presence of chlorides in the product, it was expected that fluorides would be found in the product of the process of our present invention. However, it is an unexpected and surprising result of the present invention that no fluorides are found in the isomerized product. It is apparent, therefore, that the hydrogen fluoride is adsorbed on the alumina in such manner that it is not readily removed. As a consequence, in the present invention, it is not necessary to employ a bauxite after-treater to remove halides from the isomerized product to improve its lead susceptibility, and substantial economies in operation are thereby obtained. It may be advisable, however, to subject the isomerized product of the present invention to a clay treatment to improve such qualities as gum-forming tendency and color, in a manner known to the art.

By the use of our process, the leaded octane ratings of gasolines are correspondingly increased, so that a leaded isomerized sample has a rating several units higher than an unisomerized sample containing the same amount of lead. Therefore, our process is not merely a substitute for tetraethyl lead but permits the reaching, with the stocks contemplated, of octane numbers impossible to obtain by leading alone.

While we do not desire to be bound by any theory of the mechanism of the isomerization reaction, the unusual results of the process of our invention would indicate that in addition to double bond shifting, substantial chain branching occurs.

The most important advantages of our invention lie in the economics of the process, HF-impregnated alumina being even more desirable for isomerization than HCl-impregnated alumina. A comparison between the two processes reveals that (1) the amount of HF required to activate the alumina is only about one-tenth of the amount of HCl required; (2) HF-alumina may, be used for the treatment of about seven times as much charge as HCl-alumina before revivification with more HF is required, so that less time is spent off-stream and less HF is required per barrel of charge; and (3) fluorinated hydrocarbons are for all practical purposes absent in the product from HF-alumina isomerization, whereas chlorinated products are found in the effluent from HCl-alumina, isomerization, thus making a bauxite after-treater unnecessary when using HF-alumina as the catalyst.

It is also an important advantage that the isomerization reaction in accordance with the present invention is accompanied by a minimum of undesirable side reactions, such as those mentioned hereinbefore. Furthermore, the present invention permits the upgrading of gasolines already having an octane number on the order of 66 to a rating on the order of 70.

We claim:

1. A method for isomerizing olefin hydrocarbons which comprises passing said hydrocarbons under isomerization conditions over a catalyst consisting of alumina impregnated with gaseous, anhydrous hydrogen fluoride.

2. A method for isomerizing olefin hydrocarbons which comprises passing said hydrocarbons at a temperature of from 300° to 600° C. over a catalyst consisting of alumina impregnated with gaseous, anhydrous hydrogen fluoride.

3. A method for isomerizing olefin hydrocarbons which comprises passing said hydrocarbons at a temperature of from 300° to 600° C. over a catalyst consisting of alumina impregnated with gaseous, anhydrous hydrogen fluoride at a space velocity of 0.1 to 20 volumes of said hydrocarbons per hour per volume of catalyst.

4. A method for isomerizing olefin hydrocarbons which comprises passing said hydrocarbons at a temperature of from 300° to 600° C. over a catalyst consisting of alumina impregnated with gaseous, anhydrous hydrogen fluoride at a space velocity of 0.1 to 20 volumes of said hydrocarbon per hour per volume of catalyst and at a pressure not in excess of 200 pounds per square inch.

5. A method for increasing the octane number of thermally cracked gasoline which comprises passing said gasoline under isomerization conditions over a catalyst consisting of alumina impregnated with gaseous, anhydrous hydrogen fluoride.

6. A method for increasing the octane number of thermally cracked gasoline which comprises passing said gasoline at a temperature of from 300° to 600° C. over a catalyst consisting of alumina impregnated with gaseous, anhydrous hydrogen fluoride.

7. A method for increasing the octane number of thermally cracked gasoline which comprises passing said gasoline at a temperature of from 375° to 425° C. over a catalyst consisting of alumina impregnated with gaseous, anhydrous hydrogen fluoride.

8. A method for increasing the octane number of thermally cracked gasoline which comprises passing said gasoline at a temperature of from 375° to 425° C. over a catalyst consisting of alumina impregnated with gaseous, anhydrous hydrogen fluoride at a space velocity of from 0.3 to 1.3 volumes of gasoline per hour per volume of catalyst and at substantially atmospheric pressure.

9. A method for increasing the octane number of thermally cracked gasoline comprising passing said gasoline at a temperature of from 300° to 600° C. over a catalyst consisting of alumina impregnated with about 0.6 volume of gaseous, anhydrous hydrogen fluoride per volume of alumina.

10. A method for increasing the octane number of thermally cracked gasoline comprising passing said gasoline over a catalyst consisting of alumina which has been dried and impregnated with gaseous, anhydrous hydrogen fluoride for several hours starting at room temperature and gradually raising the temperature to 400° C.

11. A method for increasing the octane number of thermally cracked gasoline comprising passing said gasoline at a temperature of from 300° to 600° C. over a catalyst consisting of alumina impregnated with gaseous, anhydrous hydrogen fluoride, interrupting the passage of gasoline periodically and passing an oxygen-containing gas over the catalyst to remove carbonaceous material deposited thereon.

12. A method for increasing the octane number of gasoline containing an appreciable quantity of olefins comprising passing said gasoline at a temperature of from 300° to 600° C. over a catalyst consisting of alumina impregnated with gaseous, anhydrous hydrogen fluoride, interrupting the passage of gasoline periodically, passing an oxygen-containing gas over the catalyst to remove carbonaceous material deposited thereon, subsequently passing gaseous, anhydrous hydrogen fluoride over the catalyst, and then resuming the passing of the gasoline.

13. A method for increasing the octane rating of an olefinic gasoline comprising isomerizing the olefins contained therein by passing said gasoline at a temperature of from 300° to 600° C. over a catalyst consisting of alumina impregnated with gaseous, anhydrous hydrogen fluoride and leaving the other constituents of said gasoline substantially unaffected.

CHARLES W. MONTGOMERY.
GEORGE L. SUMNER, Jr.
LLOYD BERG.

REFERENCES CITED

The following references are of record in the file of this patent:

UNITED STATES PATENTS

| Number | Name | Date |
|---|---|---|
| 2,331,473 | Hyman | Oct. 12, 1943 |
| 2,371,726 | Alberding | Mar. 20, 1945 |
| 2,381,562 | Stewart | Aug. 7, 1945 |
| 2,397,085 | Boedeker et al. | Mar. 26, 1946 |
| 2,406,869 | Upham | Sept. 3, 1946 |
| 2,428,741 | Plank | Oct. 7, 1947 |

FOREIGN PATENTS

| Number | Country | Date |
|---|---|---|
| 534,151 | Great Britain | Feb. 28, 1941 |
| 555,288 | Great Britain | Aug. 16, 1943 |